US008800729B2

(12) United States Patent
Yabe et al.

(10) Patent No.: US 8,800,729 B2
(45) Date of Patent: Aug. 12, 2014

(54) DAMPING FORCE CONTROL TYPE SHOCK ABSORBER

(75) Inventors: Hiroyuki Yabe, Tsukushino (JP); Yohei Katayama, Yokohama (JP); Takashi Nezu, Yokohama (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 127 days.

(21) Appl. No.: 13/423,637

(22) Filed: Mar. 19, 2012

(65) Prior Publication Data
US 2012/0247889 A1 Oct. 4, 2012

(30) Foreign Application Priority Data

Mar. 31, 2011 (JP) ................. 2011/080194

(51) Int. Cl.
*F16F 9/34* (2006.01)
(52) U.S. Cl.
USPC ................. 188/266.6; 188/322.15; 188/282.6
(58) Field of Classification Search
USPC ........ 188/266.1, 266.2, 266.5, 266.6, 322.13, 188/322.15, 282.5, 282.6
See application file for complete search history.

(56) References Cited

U.S. PATENT DOCUMENTS

| 5,282,645 | A | * | 2/1994 | Spakowski et al. | ........ 188/266.6 |
| 5,335,757 | A | * | 8/1994 | Knecht et al. | ............. 188/266.6 |
| 5,725,239 | A | * | 3/1998 | de Molina | .................. 188/266.6 |
| 6,336,536 | B1 | * | 1/2002 | Fenn et al. | ............... 188/322.15 |
| 6,371,262 | B1 | * | 4/2002 | Katou et al. | ............... 188/266.5 |
| 7,789,208 | B2 | * | 9/2010 | Yang | ........................ 188/322.15 |
| 2009/0242339 | A1 | | 10/2009 | Nakadate et al. | |

FOREIGN PATENT DOCUMENTS

JP 2009-281584 12/2009

* cited by examiner

*Primary Examiner* — Thomas J Williams
(74) *Attorney, Agent, or Firm* — Wenderoth, Lind & Ponack, LLP

(57) ABSTRACT

During either of the extension and compression strokes, hydraulic liquid flows from a cylinder upper chamber into a reservoir through an annular passage and a damping force control mechanism, and a damping force is generated by the damping force control mechanism. The check valve is provided with a sub-check valve in parallel thereto, which opens in a very low piston speed region to allow the hydraulic liquid to flow through an orifice passage. These check valves are opened successively as the piston speed increases, thereby generating a sufficiently small damping force in the very low piston speed region during the compression stroke of the piston rod, and obtaining a moderate damping force when the piston speed increases.

6 Claims, 12 Drawing Sheets

DAMPING FORCE CONTROL TYPE SHOCK ABSORBER

BACKGROUND OF THE INVENTION

The present invention relates to damping force control type shock absorbers capable of adjusting damping force characteristics.

Tube-type shock absorbers attached to suspension systems of vehicles, for example, automobiles, are generally arranged as follows. A piston connected with a piston rod is inserted in a cylinder having a hydraulic liquid sealed therein. In response to a stroke of the piston rod, the piston slidingly moves in the cylinder, causing a flow of hydraulic liquid. The hydraulic liquid flow is controlled to generate a damping force by a damping force generating mechanism comprising an orifice, a disk valve, etc. There is a publicly known damping force control type shock absorber capable of adjusting damping force characteristics by changing the flow resistance of the damping force generating mechanism using a variable orifice, and so forth.

Japanese Patent Application Publication No. 2009-281584, for example, discloses a damping force control type shock absorber having a check valve provided in a base valve in the bottom of a cylinder. The check valve allows the flow of hydraulic liquid from a reservoir to a bottom-side chamber in the cylinder. The shock absorber further has a check valve provided in a piston assembly to allow the flow of hydraulic liquid from the bottom-side chamber to a piston rod-side chamber in the cylinder. Further, the shock absorber has a damping passage provided outside the cylinder to communicate between the piston rod-side chamber in the cylinder and the reservoir. The damping passage is provided with a damping force control mechanism enabling adjustment of damping force by controlling the flow of hydraulic liquid.

In the above-described structure, during both the extension and compression strokes of the piston rod, the hydraulic liquid flows from the piston rod-side chamber in the cylinder to the reservoir through the damping passage, and damping force is generated by the damping force control mechanism. Thus, in response to either of the extension and compression strokes of the piston rod, a flow of hydraulic liquid occurs always in one direction in the damping passage. Therefore, for both the extension and compression strokes of the piston rod, damping force can be generated by a single damping force control mechanism to adjust the damping force characteristics.

The following problem is associated with a damping force control type shock absorber using a single damping force control mechanism to generate damping force against the flow of hydraulic liquid occurring in one direction in a damping passage for both the extension and compression strokes as disclosed in Japanese Patent Application Publication No. 2009-281584. That is, because both extension and compression damping force characteristics are adjusted by using a single damping force control mechanism, the damping force characteristics for either of the extension and compression strokes affect the damping force characteristics for the other stroke. Accordingly, the damping force characteristic control range is limited, so that it is difficult to obtain desired damping force characteristics.

SUMMARY OF THE INVENTION

An object of the present invention is to provide a damping force control type shock absorber capable of obtaining desired damping force characteristics by using a damping force control mechanism common to the extension and compression strokes.

The present invention provides a damping force control type shock absorber comprising a cylinder including a hydraulic liquid sealed therein, a reservoir including the hydraulic liquid and a gas sealed therein, a piston slidably fitted in the cylinder to divide the interior of the cylinder into a first chamber and a second chamber, a piston rod connected at one end thereof to the piston and including the other end extended to the outside through the first chamber, a base valve for dividing the second chamber and the reservoir from each other, a first check valve provided in the piston to allow a flow of hydraulic liquid from the second chamber toward the first chamber, a second check valve provided in the base valve to allow a flow of hydraulic liquid from the reservoir toward the second chamber, a passage for connecting the first chamber and the reservoir, and a damping force control mechanism for adjusting damping force by controlling the flow of hydraulic liquid in the passage. An orifice passage is provided in parallel to at least one of the first and second check valves. A sub-check valve is provided in the orifice passage. The sub-check valve opens at a lower pressure than the check valve to which the orifice passage is provided in parallel, and allows a flow of hydraulic liquid in the same direction as the check valve.

Figure 2:
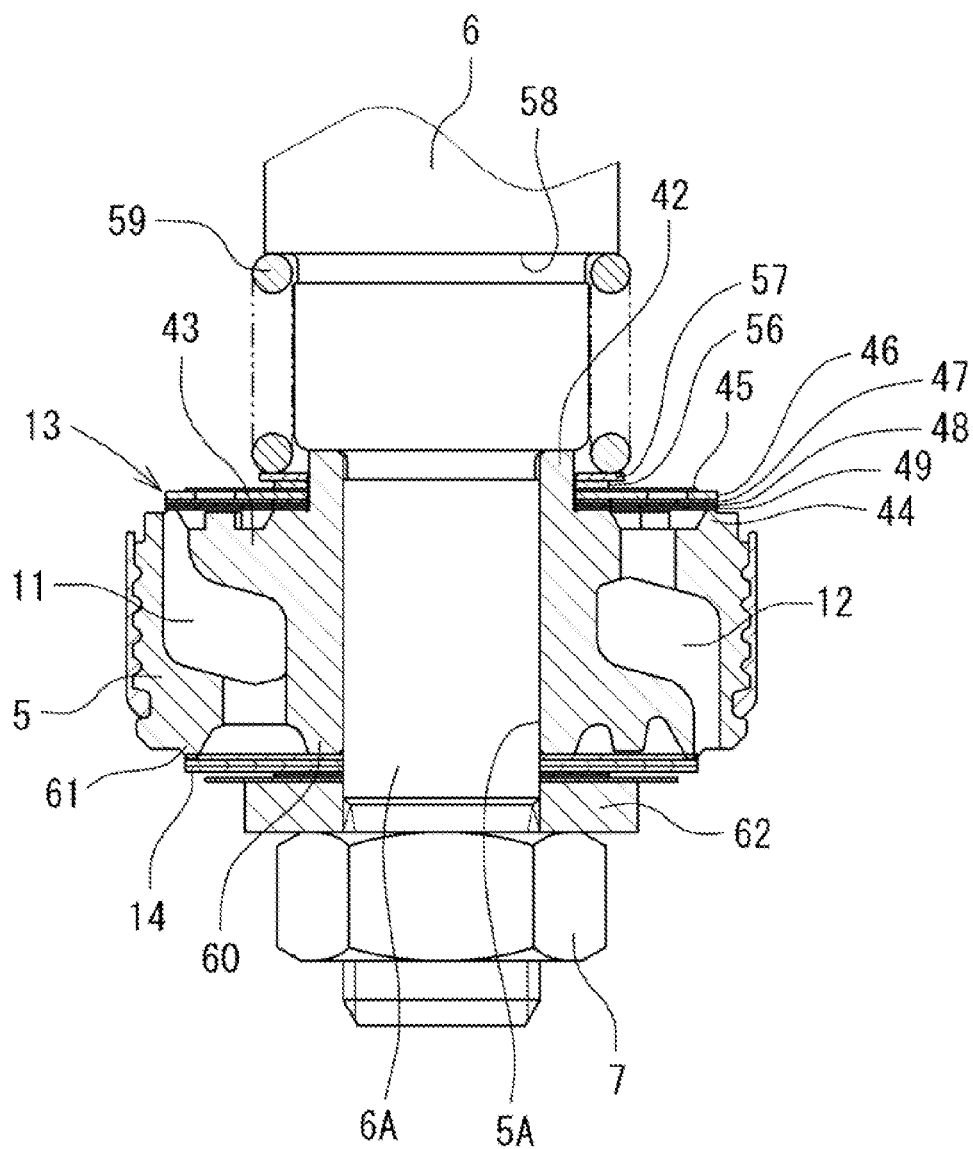
FIG. 2 is an enlarged vertical sectional view of a piston assembly of the damping force control type shock absorber shown in FIG. 1.
Figure 3A:
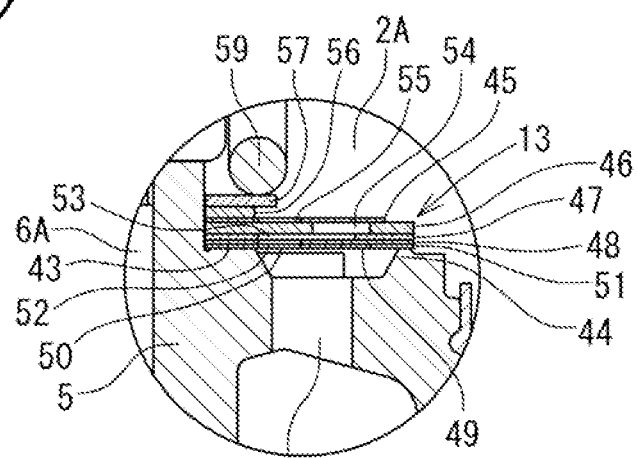

Each of FIGS. 3(A), (B), and (C) is an enlarged vertical sectional view of a part of the piston assembly in FIG. 2, showing the way in which a check valve opens and closes.

Figure 1:
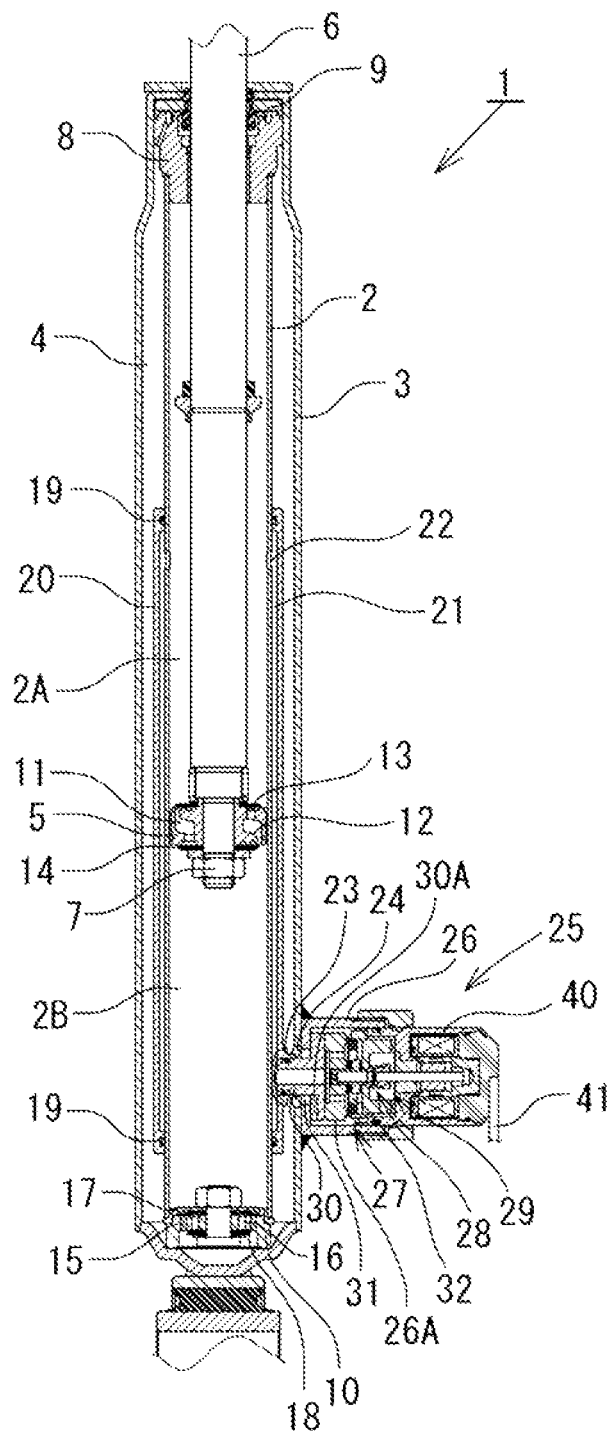
FIG. 1 is a vertical sectional view of a damping force control type shock absorber according to a first embodiment of the present invention.
Figure 4A:
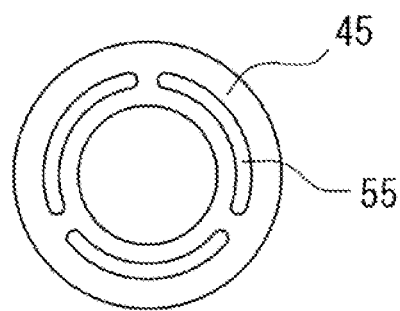

Each of FIGS. 4(A), (B), (C), (D), and (E) is a plan view of disks constituting the check valve of the damping force control type shock absorber in FIG. 1.

Figure 5:
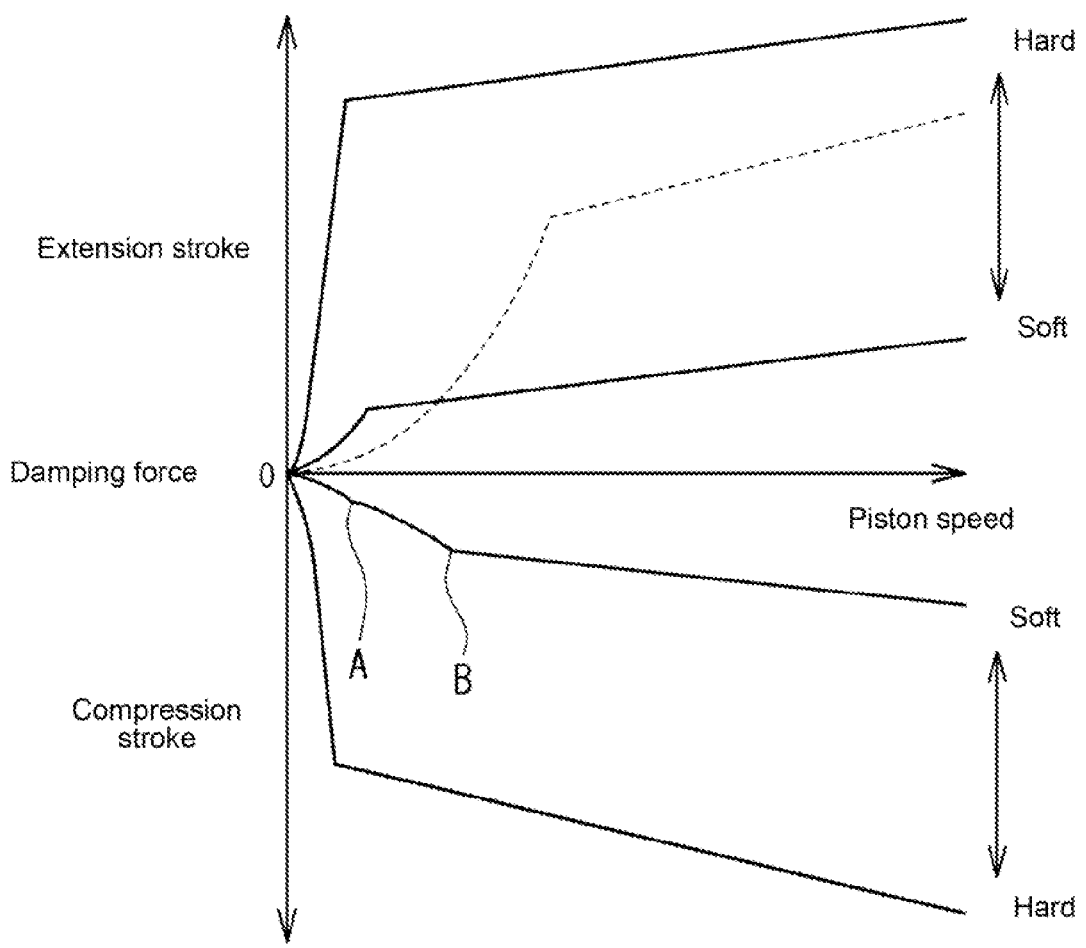

FIG. 5 is a graph showing damping force characteristics of the damping force control type shock absorber in FIG. 1.

Figure 6:
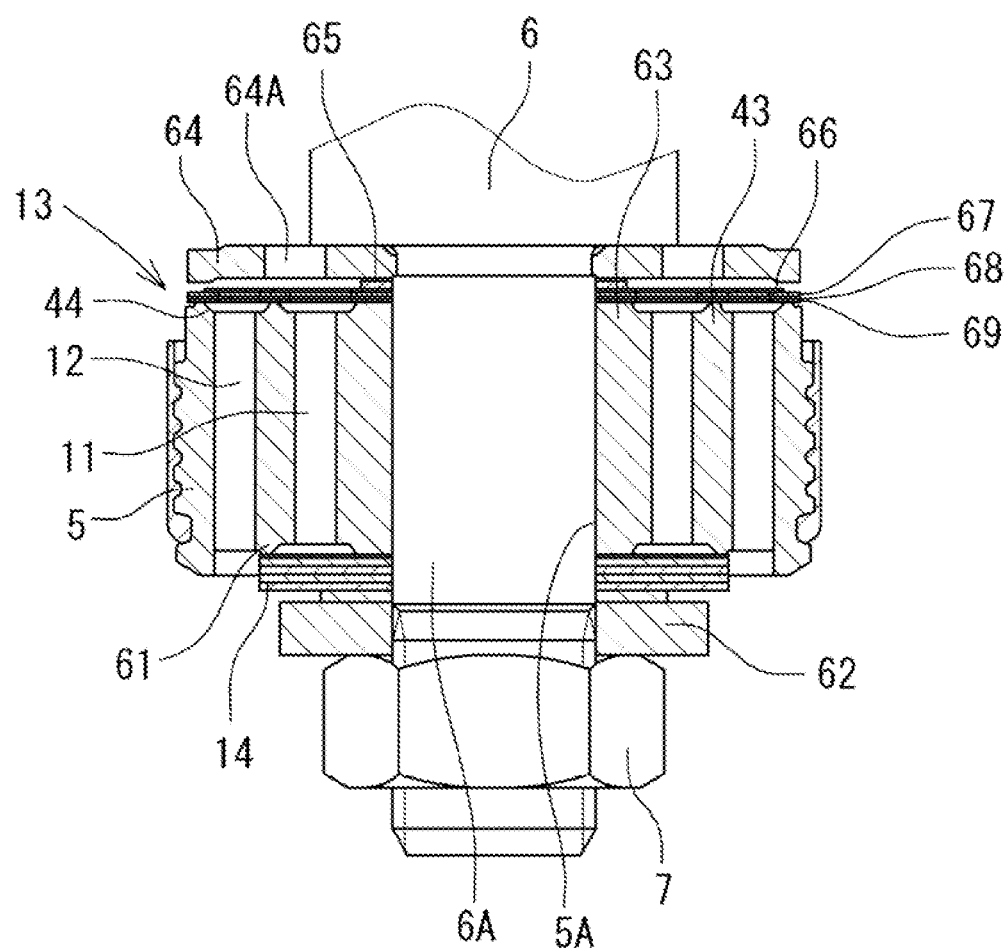

FIG. 6 is an enlarged vertical sectional view of a piston assembly of a damping force control type shock absorber according to a second embodiment of the present invention.

Figure 7A:
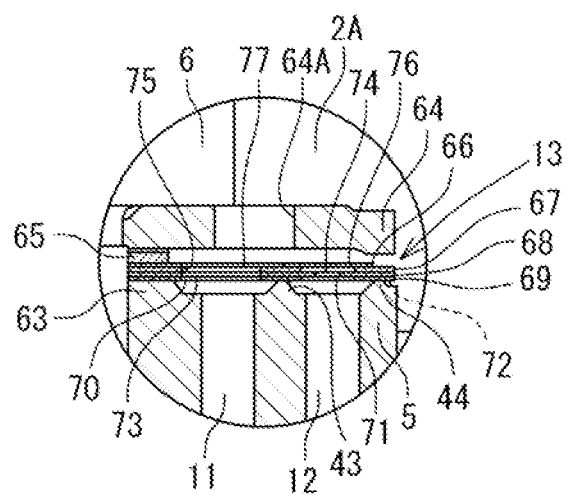

Each of FIGS. 7(A), (B), and (C) is an enlarged vertical sectional view of a part of the piston assembly in FIG. 6, showing the way in which a check valve opens and closes.

Figure 8A:
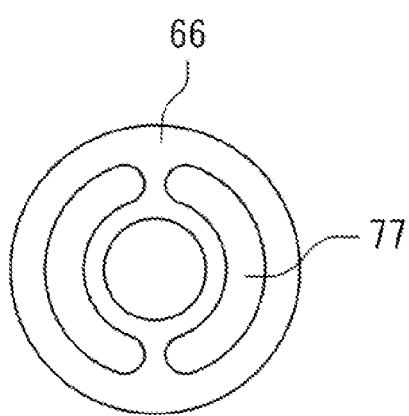

Each of FIGS. 8(A), (B), (C), and (D) is a plan view of disks constituting the check valve of the piston assembly shown in FIG. 6.

Figure 9:
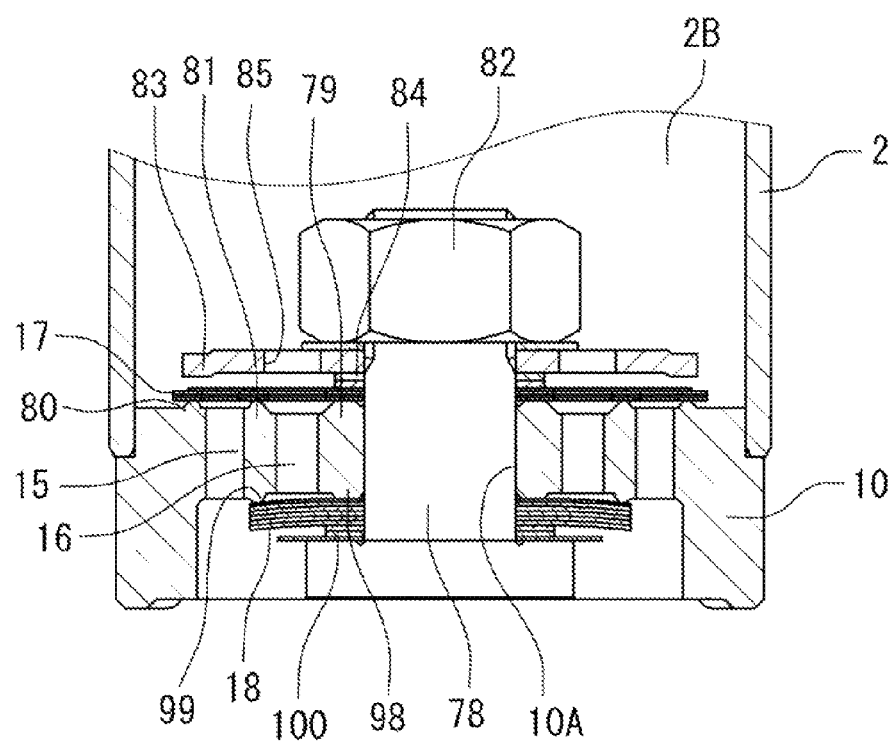

FIG. 9 is an enlarged vertical sectional view of a base valve assembly of a damping force control type shock absorber according to a third embodiment of the present invention.

Figure 10A:
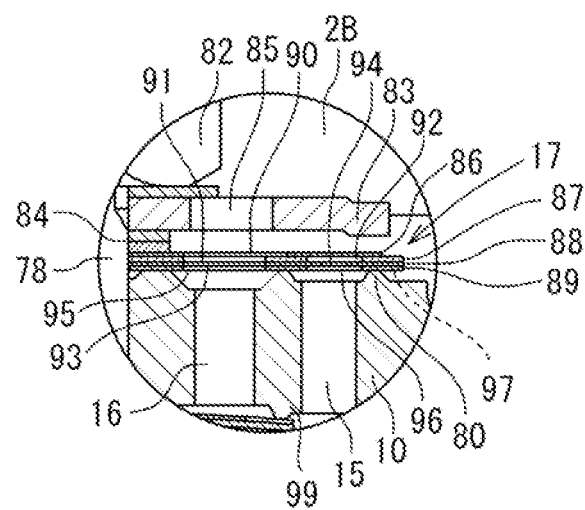

Each of FIGS. 10(A), (B), and (C) is an enlarged vertical sectional view of a part of the base valve assembly in FIG. 9, showing the way in which a check valve opens and closes.

Figure 11A:
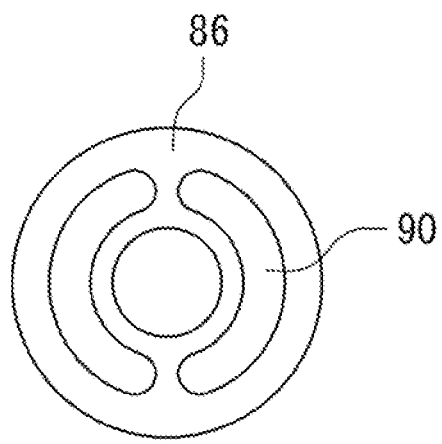

Each of FIGS. 11(A), (B), (C), and (D) is a plan view of disks constituting the check valve of the base valve assembly shown in FIG. 9.

Figure 12:
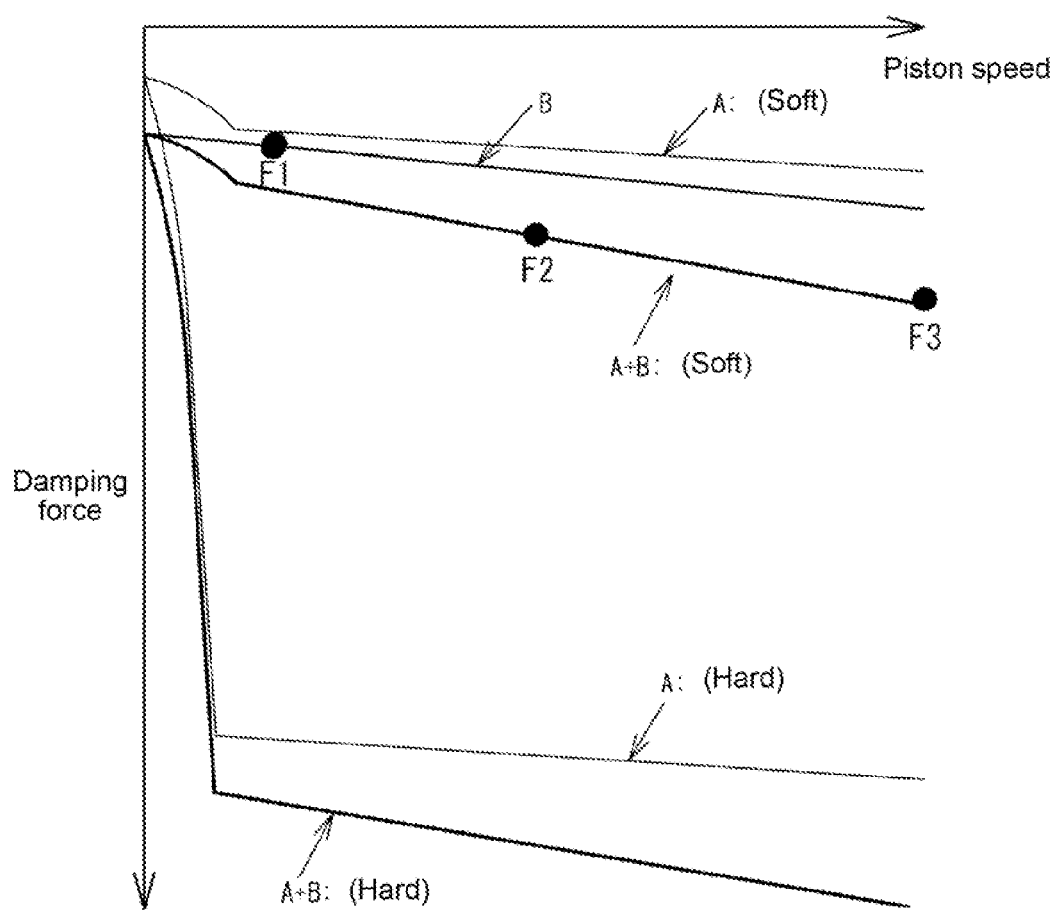

FIG. 12 is a graph showing damping force characteristics of a damping force control type shock absorber for a vehicle.

DETAILED DESCRIPTION OF THE INVENTION

Embodiments of the present invention will be explained below.

[Damping Force Characteristics and Vehicle Behavior]

Let us explain the relationship between shock absorber damping force characteristics demanded of a vehicle and the vehicle behavior with reference to FIG. 12. FIG. 12 shows the compression-side damping force characteristics of a shock absorber relative to the piston speed. Damping force characteristics demanded nowadays with respect to the vehicle behavior will be explained below for each piston speed region. Referring to FIG. 12, for the low piston speed region, the damping force should preferably be F1 or less to improve smoothness, i.e. stroke feeling, when the vehicle starts to move. For the intermediate piston speed region, the damping force should preferably be F2 or more to suppress such vibration that gives scuttle shake (for example, slightly trembling movement with a relatively small amplitude at a frequency of approximately 7 to 16 Hz) to the vehicle body. For the high piston speed region, the damping force should preferably be F3 or less to reduce thrusting-up load from a road surface when the vehicle rides over bumps. It is deemed that favorable ride quality can be obtained by satisfying all the conditions of F1 to F3.

To obtain favorable ride quality, the respective orifice areas of the damping force control mechanism and the piston and the degree of opening of disk valves provided in the damping force control mechanism and the piston are tuned so that all the conditions of F1 to F3 are met. In the following, the damping force control mechanism, including orifices and disk valves provided therein, will be referred to as "damping force control mechanism A", and the piston, including orifices and disk valves provided therein, will be referred to as "piston B", for the sake of explanation.

If the piston B has damping force characteristics as shown in FIG. 12, the total damping force A+B, which is the sum of damping forces to be generated respectively by the damping force control mechanism A and the piston B, satisfies the conditions of F2 and F3 but exceeds F1, resulting in a degraded stroke feeling. If the damping force characteristics of the piston B are lowered by increasing the orifice area of the piston B, for example, the condition of F1 can be satisfied, but the conditions of F2 and larger damping forces cannot be satisfied. Consequently, vibration gives scuttle shake to the vehicle body.

[Damping Force Control Mechanism Common to Extension and Compression Strokes]

A shock absorber having a damping force control mechanism on a side wall of an outer tube as shown in FIG. 1 is demanded to use a damping force control mechanism common to the extension and compression strokes in order to improve the installability of the shock absorber to the vehicle. However, if the compression "soft" damping force is adjusted to the point A shown in FIG. 5 without changing the characteristics of the damping force control mechanism, the extension damping force characteristics become as shown by the broken line in FIG. 5. Thus, the extension "hard" damping force reduces undesirably.

Embodiments of the present invention will be explained below with reference to the accompanying drawings.

A first embodiment of the present invention will be explained with reference to FIGS. 1 to 5.

As shown in FIG. 1, a shock absorber 1 according to the first embodiment is a tube-type shock absorber capable of adjusting damping force characteristics. The shock absorber 1 has a cylinder 2 and an outer tube 3 provided around the outer periphery of the cylinder 2. Thus, the shock absorber 1 has a twin-tube structure. An annular reservoir 4 is formed between the cylinder 2 and the outer tube 3. A piston 5 is slidably fitted in the cylinder 2. The piston 5 divides the interior of the cylinder 2 into two chambers, i.e. a cylinder upper chamber 2A (first chamber) and a cylinder lower chamber 2B (second chamber). The piston 5 is connected to one end of a piston rod 6 by a nut 7. The other end of the piston rod 6 extends through the cylinder upper chamber 2A and through a rod guide 8 and an oil seal 9, which are provided in the upper end of the twin-tube structure comprising the cylinder 2 and the outer tube 3. Thus, the other end of the piston rod 6 extends to the outside of the cylinder 2. A base valve 10 is provided in the lower end of the cylinder 2 to divide the cylinder lower chamber 2B and the reservoir 4 from each other.

The piston 5 is provided with a plurality of passages 11 and a plurality of passages 12 communicating between the cylinder upper chamber 2A and the cylinder lower chamber 2B. To simply explanations, only a passage 11 and a passage 12 will be explained below. The passage 12 is provided with a check valve 13 allowing a flow of fluid from the cylinder lower chamber 2B toward the cylinder upper chamber 2A. The passage 11 is provided with a disk valve 14 that opens when the fluid pressure in the cylinder upper chamber 2A reaches a predetermined pressure to relieve the pressure to the cylinder lower chamber 2B.

The base valve 10 is provided with passages 15 and 16 communicating between the cylinder lower chamber 2B and the reservoir 4. The passage 15 is provided with a check valve 17 constituting a second check valve that allows a flow of fluid from the reservoir 4 toward the cylinder lower chamber 2B. The passage 16 is provided with a disk valve 18 that opens when the fluid pressure in the cylinder lower chamber 2B reaches a predetermined pressure to relieve the pressure to the reservoir 4. The cylinder 2 has a hydraulic liquid sealed therein as a hydraulic fluid. The reservoir 4 has the hydraulic liquid and a gas sealed therein as hydraulic fluids.

The cylinder 2 has a separator tube 20 fitted thereover with seal members 19 interposed therebetween at the upper and lower ends of the cylinder 2. An annular passage 21 is formed between the cylinder 2 and the separator tube 20. The annular passage 21 is communicated with the cylinder upper chamber 2A through a passage 22 provided in the side wall of the upper part of the cylinder 2. The separator tube 20 has a connecting port 23 provided in the lower part of the side wall thereof. The side wall of the outer tube 3 is provided with an inlet port 24 in substantially concentric relation to the connecting port 23. The inlet port 24 is larger in diameter than the connecting port 23. A damping force control mechanism 25 is attached to the side wall of the outer tube 3. The damping force control mechanism 25 is connected to the connecting port 23 and the inlet port 24.

The damping force control mechanism 25 has a circular cylindrical casing 26 attached to the inlet port 24 of the outer tube 3. The casing 26 is provided therein with a main valve 27, which is a pilot type (back-pressure type) pressure control valve, and a pilot valve 28, which is a solenoid-driven pressure control valve controlling the valve-opening pressure of the main valve 27. The damping force control mechanism 25 further has a fail-safe valve 29 provided downstream of the pilot valve 28. The fail-safe valve 29 operates when there is a failure. The hydraulic liquid is introduced from a connecting pipe 30 connected to the connecting port 23 to serve as an inlet passage of the damping force control mechanism 25. The introduced hydraulic liquid passes through the main valve 27, the pilot valve 28 and the fail-safe valve 29 and flows into a chamber 26A surrounded by the casing 26. The hydraulic liquid in the chamber 26A flows into the reservoir 4 through a passage 30A formed in the connecting pipe 30 and through a passage 31 in an end portion of the casing 26 and the inlet port 24 of the outer tube 3.

Before the main valve 27 opens, the pilot valve 28 controls the flow of hydraulic liquid to generate a damping force. When being open, the main valve 27 mainly generates a damping force. In addition, a part of hydraulic liquid at the upstream side of the pilot valve 28 is introduced into a back pressure chamber 32 at the rear of the main valve 27, and the pressure in the back pressure chamber 32 is applied to the main valve 27 in the direction for closing the main valve 27. The damping force can be controlled by adjusting the control pressure of the pilot valve 28 with an electric current supplied to a solenoid 40 through a lead wire 41. The adjustment of the control pressure of the pilot valve 28 results in a change in the pressure in the back pressure chamber 32, and hence it is possible to adjust the valve-opening pressure and the degree of opening of the main valve 27. The fail-safe valve 29 closes when the solenoid 40 fails. Thus, the fail-safe valve 29 restricts the flow of hydraulic liquid in place of the pilot valve 28, which is now constantly open, thereby preventing an excessive reduction of damping force and maintaining a moderate damping force.

Next, the check valve 13 of the piston 5 will be explained in more detail with reference to FIGS. 2 to 4. As shown in FIG. 2, the piston 5 is provided with a circular cylindrical guide portion 42 projecting from the upper end thereof around an opening 5A into which a reduced-diameter portion 6A at the distal end of the piston rod 6 is inserted. The piston 5 is further provided with an annular inner seat portion 43 projecting from the upper end thereof around the guide portion 42. The inner seat portion 43 is smaller in projection height than the guide portion 42. Further, the piston 5 is provided with an annular outer seat portion 44 projecting from the upper end near the outer periphery thereof. The outer seat portion 44 is substantially equal in projection height to the inner seat portion 43. The upper end of the passage 11 provided in the piston 5 opens at the outer peripheral side of the outer seat portion 44. The upper end of the passage 12 provided in the piston 5 opens between the inner seat portion 43 and the outer seat portion 44.

Figure 4B:
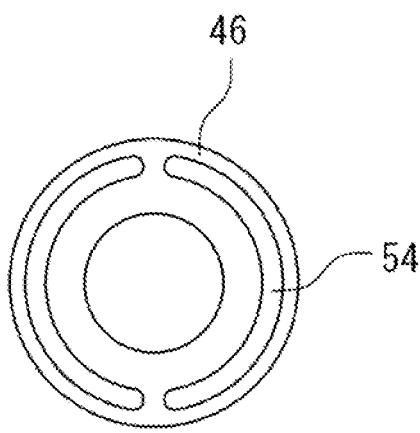
Figure 4C:
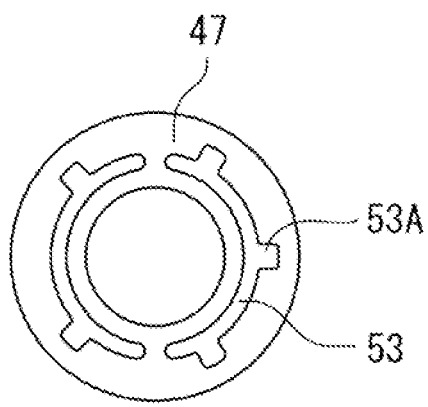
Figure 4D:
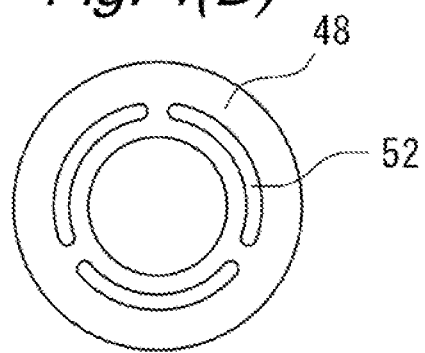
Figure 4E:
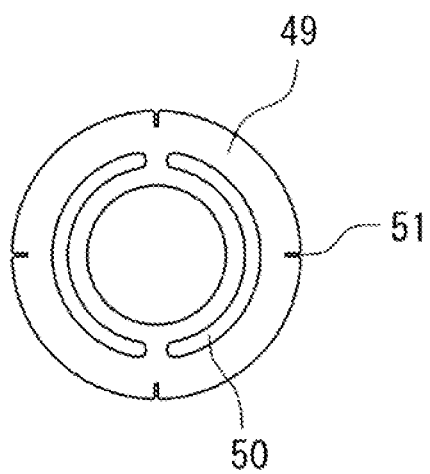

The check valve 13 has five disk-shaped members: a sub-check valve disk 45 shown in FIG. 4(A), which constitutes a sub-check valve; a seat disk 46 shown in FIG. 4(B); a notched disk 47 shown in FIG. 4(C), a passage disk 48 shown in FIG. 4(D); and a check valve disk 49 shown in FIG. 4(E), which constitutes a first check valve. These disks are stacked up in the reverse order to the order mentioned above. The guide portion 42 of the piston 5 is inserted through the respective central openings of the five disks to guide the disks axially movably.

The lowermost disk of the check valve 13, i.e. the check valve disk 49 constituting a first check valve, seats on both the inner seat portion 43 and the outer seat portion 44. As shown in FIG. 4(E), the check valve disk 49 has two circumferentially equally spaced arcuate openings 50 formed closer to the inner periphery thereof. The check valve disk 49 further has four circumferentially equally spaced notches 51 formed on the outer peripheral edge thereof. The notches 51 allow the passage 12 to constantly communicate with the cylinder upper chamber 2A when the check valve disk 49 is seated on the outer seat portion 44.

The passage disk 48 is superimposed on the check valve disk 49. As shown in FIG. 4(D), the passage disk 48 has the same diameter as the check valve disk 49 and has three circumferentially equally spaced arcuate openings 52 in a region that faces the openings 50 of the check valve disk 49.

The notched disk 47 is superimposed on the passage disk 48. As shown in FIG. 4(C), the notched disk 47 has the same diameter as the passage disk 48 and has two circumferentially equally spaced arcuate openings 53 in a region that faces the openings 52 of the passage disk 48. Each opening 53 has a plurality of notches 53A extending radially outward.

The seat disk 46 is superimposed on the notched disk 47. As shown in FIG. 4(B), the seat disk 46 has the same diameter as the notched disk 47 and has two circumferentially equally spaced arcuate openings 54 in a region that faces the notches 53A of the notched disk 47. The seat disk 46 is thicker in plate thickness than the other disks and hence high in rigidity and substantially non-deflectable.

The sub-check valve disk 45 constituting a sub-check valve is superimposed on the seat disk 46. As shown in FIG. 4 (A), the sub-check valve disk 45 is smaller in diameter than the seat disk 46. The sub-check valve disk 45 is configured to close the openings 54 of the seat disk 46 with an outer peripheral portion thereof. The sub-check valve disk 45 is flexible and has three circumferentially equally spaced arcuate openings 55 formed closer to the inner periphery of the check valve 13 than the openings 54 of the seat disk 46.

When the seat disk 46, the notched disk 47, the passage disk 48 and the check valve disk 49 are stacked, the openings 54, 53, 52, 50 and the notches 53A are connected to each other to form an orifice passage that communicates between the passage 12 and the cylinder upper chamber 2A.

Over the sub-check valve disk 45, an annular spacer 56 smaller in diameter than the openings 55 and a spring retainer 57 are stacked. A valve spring 59 is interposed between the spring retainer 57 and a step portion 58 formed on the outer periphery of the piston rod 6. The valve spring 59 is a compression coil spring. The respective inner peripheral portions of the five disks, which constitute the check valve 13, are pressed toward the inner seat portion 43 by the spring force of the valve spring 59.

The lower end of the piston 5 has an inner seat portion 60 projecting from an inner peripheral part thereof. An outer seat portion 61 projects from an outer peripheral part of the lower end of the piston 5. The passage 11 opens between the inner seat portion 60 and the outer seat portion 61. The passage 12 opens at the outer peripheral side of the outer seat portion 61. A disk valve 14 formed from a plurality of stacked disks seats on the inner and outer seat portions 60 and 61. The disk valve 14 is clamped at an inner peripheral portion thereof to the piston 5 by a retainer 62. The disk valve 14 deflects upon receiving the pressure in the passage 11, causing the outer peripheral portion of the disk valve 14 to separate from the outer seat portion 61. Thus, the disk valve 14 opens.

The following is an explanation of the operation of this embodiment arranged as stated above.

The damping force control type shock absorber 1 is installed between two members movable relative to each other, e.g. a sprung member (vehicle body-side member) and an unsprung member (wheel-side member) of a suspension system of a vehicle, with the piston rod 6 side facing up, and the base valve 10 side facing down. The lead wire 41 is connected to a controller.

During the extension stroke of the piston rod 6, the movement of the piston 5 in the cylinder 2 causes the check valve 13 of the piston 5 to operate as follows. As shown in FIG. 3(A), the check valve disk 49 seats on the inner and outer seat portions 43 and 44, and the sub-check valve disk 45 seats on the seat disk 46 to close the openings 54. Thus, the passage 12 is cut off except a slight flow path area provided by the notches 51 of the check valve disk 49. Consequently, before the disk valve 14 opens, the fluid in the cylinder upper chamber 2A is pressurized to pass through the passage 22 and the annular passage 21 and to flow from the connecting port 23 of the separator tube 20 into the connecting pipe 30, which forms the inlet passage of the damping force control mechanism 25. The fluid flowing into the connecting pipe 30 passes through the main valve 27, the pilot valve 28 and the fail-safe valve 29 to flow into the chamber 26A surrounded by the casing 26 and further passes through the passage 30A in the connecting pipe 30 and the passage 31 in the end portion of the casing 26 and further through the inlet port 24 of the outer tube 3 to flow into the reservoir 4.

At this time, an amount of hydraulic liquid corresponding to the amount of movement of the piston 5 flows into the cylinder lower chamber 2B from the reservoir 4 by opening the check valve 17 of the base valve 10.

When the pressure in the cylinder upper chamber 2A reaches the valve-opening pressure of the disk valve 14 of the piston 5, the disk valve 14 opens to relieve the pressure in the cylinder upper chamber 2A into the cylinder lower chamber 2B, thereby preventing an excessive increase in pressure in the cylinder upper chamber 2A.

Accordingly, during the extension stroke of the piston rod 6, the damping force control mechanism 25 operates as follows. Before the main valve 27 opens (i.e. in the low piston speed region), the pilot valve 28 generates a damping force. After the main valve 27 has opened (i.e. in the high piston speed region), the main valve 27 generates a damping force according to the degree of opening thereof. The damping force can be controlled by adjusting the control pressure of the pilot valve 28 with an electric current supplied to the solenoid 40. The adjustment of the control pressure of the pilot valve 28 results in a change in the pressure in the back pressure chamber 32, and hence it is possible to control the valve-opening pressure and the degree of opening of the main valve 27. If the solenoid 40 should fail, the fail-safe valve 29 closes to restrict the flow of hydraulic liquid in place of the pilot valve 28, which is now constantly open, thereby preventing an excessive reduction of damping force and maintaining a moderate damping force.

It should be noted that the damping force control mechanism 25 is not limited to the above-described pilot-type pressure control valve but may be any type of pressure control valve or flow control valve, for example, that generates a damping force by controlling the flow of hydraulic fluid from the cylinder upper chamber 2A toward the reservoir 4. The damping force control mechanism 25 may be one that is operated by hand but not with an actuator to control damping force.

During the compression stroke of the piston rod 6, the movement of the piston 5 in the cylinder 2 closes the check valve 17 for the passage 15 in the base valve 10. Before the disk valve 18 opens, the fluid in the cylinder lower chamber 2B flows into the cylinder upper chamber 2A through the passage 12 and the check valve 13, and an amount of hydraulic liquid corresponding to the amount by which the piston rod 6 enters the cylinder 2 flows from the cylinder upper chamber 2A into the reservoir 4 through a flow path similar to that during the above-described extension stroke.

When the pressure in the cylinder lower chamber 2B reaches the valve-opening pressure of the disk valve 18 of the base valve 10, the disk valve 18 opens to relieve the pressure in the cylinder lower chamber 2B into the reservoir 4, thereby preventing an excessive increase in pressure in the cylinder lower chamber 2B.

When the piston speed is very low (e.g. less than 0.01 m/s), the check valve 13 operates as shown in FIG. 3(A). That is, the sub-check valve disk 45 seats on the seat disk 46 to close the openings 54, and the check valve disk 49 seats on both the inner seat portion 43 and the outer seat portion 44 to close the passage 12. Accordingly, the hydraulic liquid flows from the cylinder lower chamber 2B into the cylinder upper chamber 2A through only the notches 51 of the check valve disk 49.

Figure 3B:
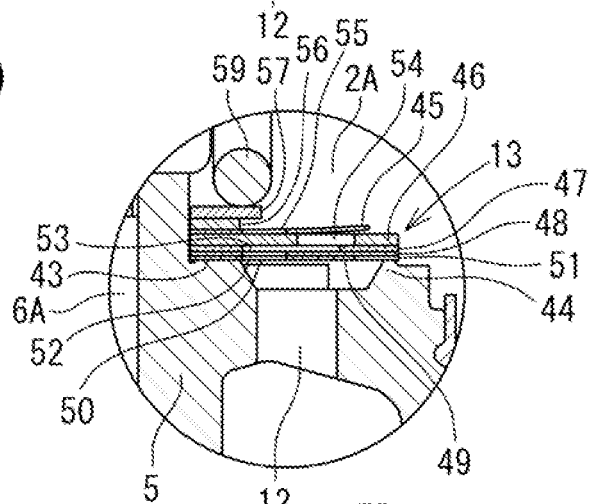

When the piston speed increases (e.g. to not less than 0.01 m/s) and consequently the pressure in the cylinder lower chamber 2B increases, the check valve 13 operates as shown in FIG. 3(B). That is, the sub-check valve disk 45 deflects, and the outer peripheral portion of the sub-check valve disk 45 separates from the seat disk 46 to open the openings 54. Accordingly, the hydraulic liquid in the cylinder lower chamber 2B flows into the cylinder upper chamber 2A through the orifice passage formed by the openings 50, 52, 53, the notches 53A and the openings 54.

Figure 3C:
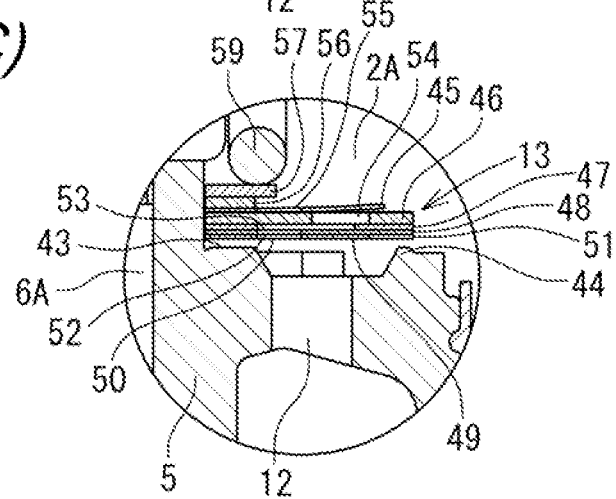

When the piston speed further increases (e.g. to not less than 0.05 m/s) and consequently the pressure in the cylinder lower chamber 2B further increases, the check valve 13 operates as shown in FIG. 3(C). That is, the valve spring 59 is compressed, and the check valve disk 49 moves together with the other disks and with the spacer 56 and the spring retainer 57 to separate from the inner seat portion 43 and the outer seat portion 44. Consequently, the hydraulic liquid in the cylinder lower chamber 2B flows directly into the cylinder upper chamber 2A through the passage 12.

Thus, the sub-check valve disk 45 and the check valve disk 49 open successively. Consequently, the flow path area of the passage 12 increases stepwise; and the increase of damping force (i.e. the slope of the damping force characteristic curve) decreases stepwise.

It should be noted that the piston speed at which the check valve disk 49 opens is set at about 0.05 m/s (not more than 0.1 m/s) at which a frictional damping force is generated in, the very low piston speed region. Therefore, the piston speed at which the sub-check valve disk 45 opens is set at about 0.01 m/s (not more than 0.05 m/s), which is lower than the piston speed at which the check valve disk 49 opens. By so doing, the advantageous effect can be exhibited even more favorably. The piston speed at which the check valve disk 49 opens is lower than the piston speed at which the main valve 27 of the damping force control mechanism 25 opens.

Damping force generated during the compression stroke of the piston rod 6 is the sun of damping force generated by the check valve 13 and damping force generated by the damping force control mechanism 25. In this regard, the check valve 13 is configured to generate damping force so that the increase of damping force decreases stepwise from the very low piston speed region. Accordingly, it is possible to generate a proper damping force in the very low piston speed region, and still possible to obtain a proper damping force in the low, intermediate and high piston speed regions by stepwisely reducing the increase of damping force generated by the check valve 13. During the compression stroke also, the damping force can be controlled by the damping force control mechanism 25 in the same way as during the above-described extension stroke. The check valve 13 is closed during the extension stroke of the piston rod 6. Therefore, the check valve 13 exerts no influence on the extension damping force characteristics.

FIG. 5 shows the damping force characteristics of the damping force control type shock absorber 1. In FIG. 5, reference symbol A represents the valve opening point of the sub-check valve disk 45 of the check valve 13 and reference symbol B represents the valve opening point of the check valve disk 49 of the check valve 13 when the damping force control mechanism 25 is adjusted to a "soft" position at which the damping force becomes the smallest. Because the "soft" valve opening point in the low piston speed region of the compression stroke can be adjusted to A, it is possible to improve smoothness, i.e. stroke feeling, when the vehicle starts to move. In addition, the "soft" valve opening point in the intermediate piston speed region can be adjusted to B by the sub-check valve disk 45. Therefore, it is possible to suppress such vibration that gives scuttle shake to the vehicle body. In addition, separation of the check valve disk 49 from the inner seat portion 43 and the outer seat portion 44 allows the flow path area of the passage 12 to be increased without interfering with the flow through the passage 12. Accordingly, it is possible to suppress the increase of "soft" damping force in the high piston speed region and hence possible to reduce thrusting-up load from a road surface when the vehicle rides over bumps.

Thus, it is possible to obtain satisfactory "soft" damping force for the compression stroke over a range of from low to high piston speed regions. Therefore, it is possible to realize a favorable vehicle ride quality. In addition, the contrivance is applied to the check valve 13 provided in the piston assembly, which is capable of changing characteristics for the extension and compression strokes, but not to a part of the damping force control mechanism 25 that is common to the extension and compression strokes. Therefore, it is possible to reduce the damping force characteristics in the compression low piston speed region and to suppress the reduction of "hard" damping force without exerting any influence on the extension damping force characteristics. Accordingly, even when "soft" damping force in the compression low piston speed region is reduced, the extension and compression "hard" damping force characteristics can be kept high. Therefore, it is also possible to improve steering stability while keeping the favorable vehicle ride quality.

Accordingly, even when a singe damping force control mechanism is used for the extension and compression strokes, damping force characteristics can be made different between the extension and compression strokes. Because it is possible to use a damping force control mechanism common to the extension and compression strokes, it is possible to improve the installability of the shock absorber to the vehicle.

In the above-described structure, responsiveness can be improved by reducing the diameter of the sub-check valve disk 45 and reducing the flexural rigidity thereof so that the disk 45 is readily deflectable. By providing the openings 55 in the inner peripheral part of the sub-check valve disk 45, the flexural rigidity of the disk 45 can be reduced, and it is also possible to prevent the sub-check valve disk 45 from sticking to the seat disk 46, which might otherwise be caused by fluid force, thereby allowing smooth opening of the valve. Accordingly, the sub-check valve disk 45 can open immediately after the piston rod 6 has been reversed from the extension stroke to the compression stroke. Therefore, it is also possible to reduce what is called rapping noise transmitted to the piston rod 6. In addition, the check valve 13 can be changed in valve opening characteristics by varying the number of disks stacked, the thickness thereof, the size of openings and notches, and so forth. Therefore, it is possible to increase the degree of freedom for adjusting the damping force characteristics.

Next, a second embodiment of the present invention will be explained with reference to FIGS. 6 to 8. It should be noted that, in the following, only the piston assembly is shown in the figures, and that members or portions similar to those of the foregoing first embodiment are denoted by the same reference numerals as in the first embodiment, and further that only the points in which the second embodiment differs from the first embodiment will be explained in detail.

In the damping force control type shock absorber according to the second embodiment, as shown in FIGS. 6 to 8, passages 11 in a piston 5 are disposed closer to the inner periphery of the piston 5 in parallel to the axis thereof. Passages 12 in the piston 5 are disposed closer to the outer periphery of the piston 5 in parallel to the axis thereof. The upper end of the piston 5 has no guide portion 42, but instead has an annular clamp portion 63 projecting from the peripheral edge of an opening 5A of the piston 5. An inner seat portion 43 projects from an intermediate region between the clamp portion 63 and an outer seat portion 44. The passages 11 open between the clamp portion 63 and the inner seat portion 43.

A check valve 13 comprises a plurality of disk-shaped members (described later). The check valve 13 is clamped at an inner peripheral portion thereof through a spacer 65 and a retainer 64, and seats on both the inner seat portion 43 and the outer seat portion 44. The spacer 65 is somewhat smaller in diameter than the clamp portion 63. The retainer 64 has substantially the same diameter as the check valve 13. The spacer 65 and the retainer 64 are provided between the clamp portion 63 of the piston 5 and a step portion at the proximal end of a reduced-diameter portion 6A of a piston rod 6. The retainer 64 limits the amount of lift of the check valve 13 and has openings 64A provided in a radially intermediate region thereof.

Figure 8B:
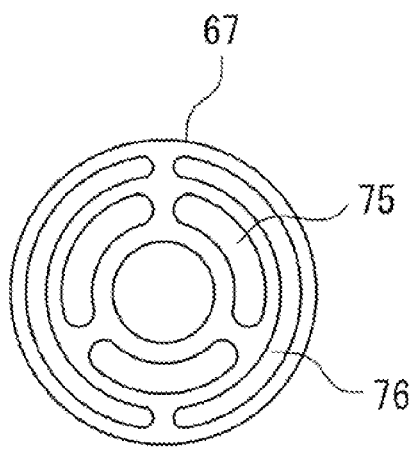
Figure 8C:
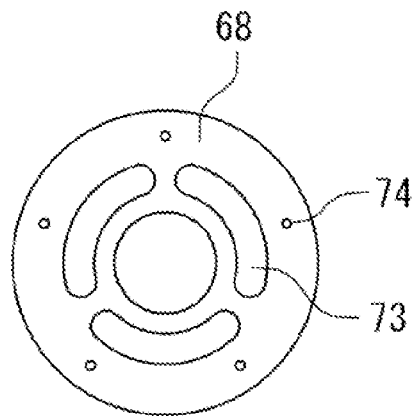
Figure 8D:
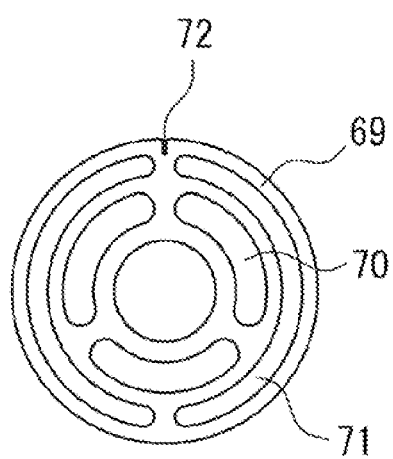

The check valve 13 has four disk-shaped members: a sub-check valve disk 66 shown in FIG. 8(A); a seat disk 67 shown in FIG. 8(B); an orifice disk 68 shown in FIG. 8(C); and a check valve disk 69 shown in FIG. 8(D). These disks are stacked up in the reverse order to the order mentioned above. The disks have the reduced-diameter portion 6A of the piston rod 6 inserted through their respective central openings, and are clamped at the inner peripheral portions thereof between the clamp portion 63 and the spacer 65.

The lowermost disk of the check valve 13, i.e. the check valve disk 69, constitutes a first check valve and seats on both the inner seat portion 43 and the outer seat portion 44. As shown in FIG. 8(D), the check valve disk 69 has three circumferentially equally spaced arcuate openings 70 formed closer to the inner periphery thereof. The check valve disk 69 further has two circumferentially equally spaced arcuate openings 71 formed closer to the outer periphery thereof. Further, the check valve disk 69 has a notch 72 (orifice) formed on the outer peripheral edge thereof. The notch 72 allows the passages 12 to constantly communicate with the cylinder upper chamber 2A when the check valve disk 69 seats on the outer seat portion 44.

The orifice disk 68 is superimposed on the check valve disk 69. As shown in FIG. 8(C), the orifice disk 68 has the same diameter as the check valve disk 69 and has three circumferentially equally spaced arcuate openings 73 in a region that faces the openings 70 of the check valve disk 69. The orifice disk 68 further has five circumferentially equally spaced orifices 74 in a region that faces the openings 71 of the check valve disk 69.

The seat disk 67 is superimposed on the orifice disk 68. As shown in FIG. 8(B), the seat disk 67 has the same diameter as the orifice disk 68 and has three circumferentially equally spaced arcuate openings 75 in a region that is closer to the inner periphery thereof and that faces the three openings 73 of the orifice disk 68. The seat disk 67 further has two circumferentially equally spaced arcuate openings 76 in a region that is closer to the outer periphery thereof and that faces the five orifices 74 of the orifice disk 68.

The sub-check valve disk 66 constitutes a sub-check valve and is superimposed on the seat disk 67. As shown in FIG. 8(A), the sub-check valve disk 66 is smaller in diameter than the seat disk 67 and has two circumferentially equally spaced arcuate openings 77 in a region that is closer to the inner periphery thereof and that faces the three openings 75 of the seat disk 67. The sub-check valve disk 66 is configured to close the openings 76 of the seat disk 67 with an outer peripheral portion thereof.

When the sub-check valve disk 66, the seat disk 67, the orifice disk 68 and the check valve disk 69 are stacked, the openings 70, 73, 75 and 77, which are closer to the respective inner peripheries of the four disks, are connected to each other to constantly communicate between the passages 11 and the cylinder upper chamber 2A. In addition, the openings 71, the orifices 74 and the openings 76, which are closer to the respective outer peripheries of the four disks, are connected to each other to form an orifice passage that allows the passages 12 and the cylinder upper chamber 2A to communicate with each other through the orifices 74.

Figure 7B:
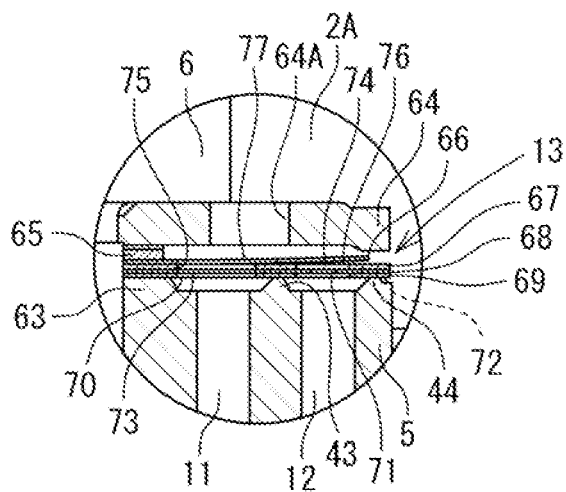

With the above-described structure, the check valve 13 operates as shown in FIG. 7 during the compression stroke of the piston rod 6. When the piston speed is very low, the check valve 13 operates as shown in FIG. 7(A). That is, the sub-check valve disk 66 seats on the seat disk 67 to close the openings 76, and the check valve disk 69 seats on both the inner seat portion 43 and the outer seat portion 44 to close the passages 12. Accordingly, the hydraulic liquid flows from the cylinder lower chamber 2B into the cylinder upper chamber 2A through only the notch 72 of the check valve disk 69. When the piston speed increases and consequently the pressure in the cylinder lower chamber 2B increases, the check valve 13 operates as shown in FIG. 7(B). That is, the sub-check valve disk 66 deflects, and the outer peripheral portion of the sub-check valve disk 66 separates from the seat disk 67 to open the openings 76. Consequently, the hydraulic liquid in the cylinder lower chamber 2B flows into the cylinder upper chamber 2A through the openings 71, the orifices 74 and the openings 76.

Figure 7C:
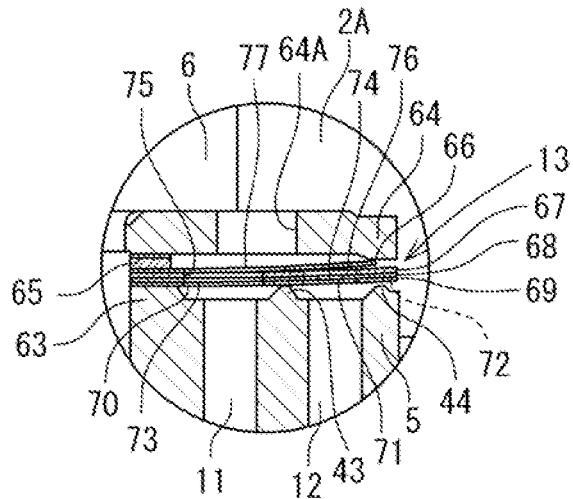

When the piston speed further increases and consequently the pressure in the cylinder lower chamber 2B further increases, the check valve 13 operates as shown in FIG. 7(C). That is, the check valve disk 69 deflects together with the orifice disk 68 and the seat disk 67, so that the outer peripheral portion of the check valve disk 69 separates from the outer seat portion 44. Consequently, the hydraulic liquid in the cylinder lower chamber 2B flows directly into the cylinder upper chamber 2A through the passages 12. Thus, the flow path area of the passages 12 increases stepwise, and the increase of damping force decreases stepwise. Thus, the second embodiment offers advantageous effects similar to those of the foregoing first embodiment.

Next, a third embodiment of the present invention will be explained with reference to FIGS. 9 to 11. It should be noted that, in the following, only the base valve assembly is shown in the figures, and that members or portions similar to those of the foregoing embodiments are denoted by the same reference numerals as in the foregoing embodiments, and further that only the points in which the third embodiment differs from the foregoing embodiments will be explained in detail. Further, in the damping force control type shock absorber according to the third embodiment, the check valve 17 of the base valve 10 has a structure similar to that of the check valve 13 of the piston 5 in the second embodiment shown in FIGS. 6 to 8.

Figure 10B:
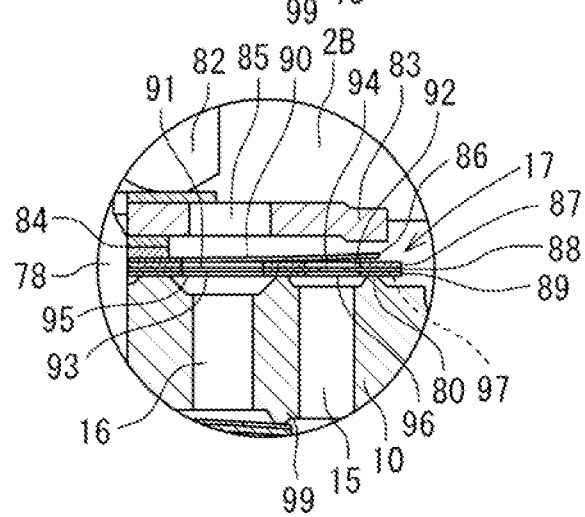
Figure 10C:
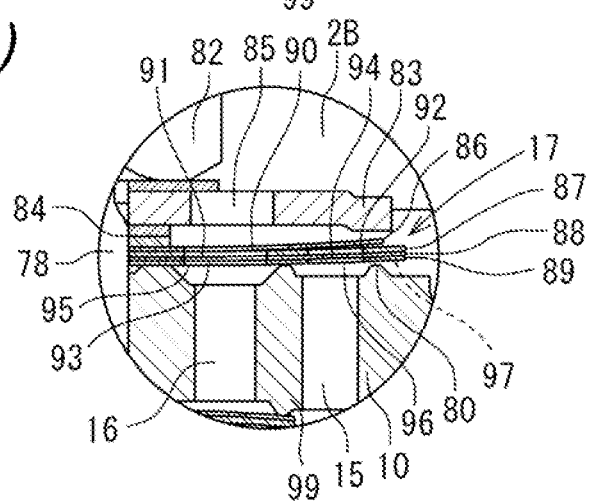

As shown in FIGS. 9 to 11, the base valve 10 has passages 16 disposed closer to the inner periphery of the base valve 10 in parallel to the axis thereof. The base valve 10 further has passages 15 disposed closer to the outer periphery of the base valve 10 in parallel to the axis thereof. The upper end of the base valve 10 is provided with an annular clamp portion 79 projecting from the peripheral edge of an opening 10A into which a pin 78 is inserted. The upper end of the base valve 10 is further provided with an annular outer seat portion 80 projecting from an outer peripheral part thereof. Further, the upper end of the base valve 10 is provided with an annular inner seat portion 81 projecting from an intermediate region between the clamp portion 79 and the outer seat portion 80. The passages 15 open between the outer seat portion 80 and the inner seat portion 81, and the passages 16 open between the inner seat portion 81 and the clamp portion 79.

The check valve 17 is clamped at an inner peripheral portion thereof between the clamp portion 79 and a nut 82 attached to the distal end of the pin 78 with a retainer 83 and a spacer 84 interposed between the check valve 17 and the nut 82. Thus, the check valve 17 seats on both the inner seat portion 81 and the outer seat portion 80. The retainer 83 has openings 85 provided in a radially intermediate region thereof.

Figure 11B:
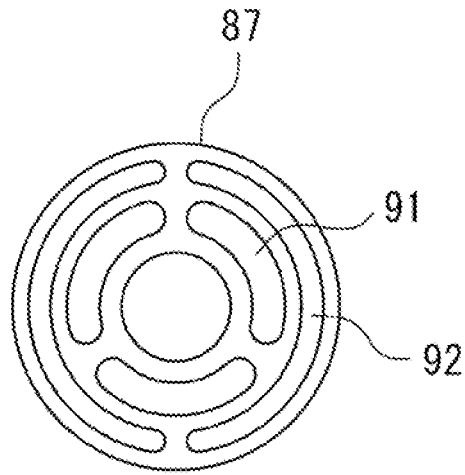
Figure 11C:
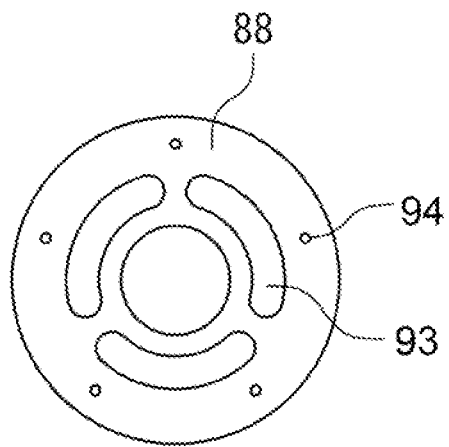
Figure 11D:
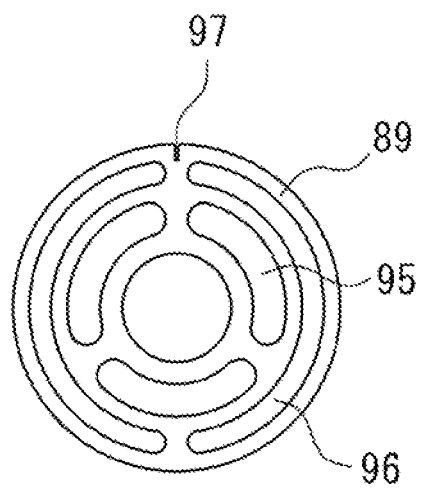

The check valve 17 has four disk-shaped members: a sub-check valve disk 86 shown in FIG. 11(A); a seat disk 87 shown in FIG. 11(B); an orifice disk 88 shown in FIG. 11(C); and a check valve disk 89 shown in FIG. 11(D). These disks are stacked up in the reverse order to the order mentioned above. The disks have the pin 78 inserted through their respective central openings, and are clamped at the inner peripheral portions thereof between the clamp portion 79 and the spacer 84.

The sub-check valve disk 86, which constitutes a sub-check valve, the seat disk 87, the orifice disk 88, and the check valve disk 89, which constitutes a second check valve, are similar in configuration to those shown in FIGS. 8(A) to (D). That is, the sub-check valve disk 86 has openings 90. The seat disk 87 has openings 91 and 92. The orifice disk 88 has openings 93 and orifices 94. The check valve disk 89 has openings 95 and 96 and a notch 97.

When the sub-check valve disk 86, the seat disk 87, the orifice disk 88 and the check valve disk 89 are stacked, the openings 90, 91, 93 and 95, which are closer to the respective inner peripheries of the four disks, are connected to each other to constantly communicate between the passages 16 and the cylinder lower chamber 2B. The openings 92, the orifices 94 and the openings 96, which are closer to the respective outer peripheries of the four disks, are connected to each other to form an orifice passage that allows the passages 15 and the cylinder lower chamber 2B to communicate with each other through the orifices 94.

The lower end of the base valve 10 is provided with a clamp portion 98 projecting from an inner peripheral part thereof. An outer seat portion 99 is provided to project from an outer peripheral part of the lower end of the base valve 10. The passages 16 open between the clamp portion 98 and the outer seat portion 99. The passages 15 open at the outer peripheral side of the outer seat portion 99. A disk valve 18 seats on the outer seat portion 99. The disk valve 18 comprises a plurality of stacked disks. The disk valve 18 is clamped at an inner peripheral portion thereof between the clamp portion 98 and a spacer 100. The disk valve 18 deflects upon receiving the pressure in the passages 16, causing the outer peripheral portion thereof to separate from the outer seat portion 99. Thus, the disk valve 18 opens.

With the above-described structure, the check valve 17 of the base valve 10 operates as shown in FIG. 10 during the extension stroke of the piston rod 6. When the piston speed is very low, the check valve 17 operates as shown in FIG. 10(A). That is, the sub-check valve disk 86 seats on the seat disk 87 to close the openings 92, and the check valve disk 89 seats on both the inner seat portion 81 and the outer seat portion 80 to close the passages 15. Accordingly, the hydraulic liquid passes through the notch 97 of the check valve disk 89 to flow from the reservoir 4 into the cylinder lower chamber 2B through the passages 15.

When the piston speed increases and consequently the differential pressure between the reservoir 4 and the cylinder lower chamber 2B increases, the check valve 17 operates as shown in FIG. 11(B). That is, the sub-check valve disk 86 deflects, and the outer peripheral portion of the sub-check valve disk 86 separates from the seat disk 87 to open the openings 92. Consequently, the hydraulic liquid in the reservoir 4 flows into the cylinder lower chamber 2B from the passages 15 through the orifice passage formed by the openings 92, the orifices 94 and the openings 96.

When the piston speed further increases and consequently the differential pressure between the reservoir 4 and the cylinder lower chamber 2B further increases, the check valve 17 operates as shown in FIG. 11(C). That is, the check valve disk 89 deflects together with the orifice disk 88 and the seat disk 87, and the outer peripheral portion of the check valve disk 89 separates from the outer seat portion 80. Consequently, the hydraulic liquid in the reservoir 4 flows directly into the cylinder lower chamber 2B through the passages 15.

Thus, the flow path area of the passages 15 increases stepwise, and the increase of damping force decreases stepwise.

Damping force generated during the extension stroke of the piston rod 6 is the sun of damping force generated by the check valve 17 of the base valve 10 and damping force generated by the damping force control mechanism 25. In this regard, the check valve 17 is configured to generate damping force so that the increase of damping force decreases stepwise from the very low piston speed region. Accordingly, it is possible to generate a proper damping force in the very low piston speed region, and still possible to obtain a proper damping force in the low, intermediate and high piston speed regions by stepwisely reducing the increase of damping force generated by the check valve 17. The check valve 17 is closed during the compression stroke of the piston rod 6. Therefore, the check valve 17 exerts no influence on the compression damping force characteristics.

According to the foregoing embodiments, desired damping force characteristics can be obtained by using a damping force control mechanism common to the extension and compression strokes.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority under 35 U.S.C. section 119 to Japanese Patent Application No. 2011-080194 filed on Mar. 31, 2011.

The entire disclosure of Japanese Patent Application No. 2011-080194 filed on Mar. 31, 2011 including specification, claims, drawings and summary is incorporated herein by reference in its entirety.

What is claimed is:
1. A damping force control type shock absorber comprising:
    a cylinder including a hydraulic liquid sealed therein;
    a reservoir including the hydraulic liquid and a gas sealed therein;
    a piston slidably fitted in the cylinder to divide an interior of the cylinder into a first chamber and a second chamber;
    a piston rod connected at one end thereof to the piston and including an another end extended to an outside through the first chamber;
    a base valve for dividing the second chamber and the reservoir from each other;
    a first check valve provided in the piston to allow a flow of hydraulic liquid from the second chamber toward the first chamber;
    a second check valve provided in the base valve to allow a flow of hydraulic liquid from the reservoir toward the second chamber;
    a passage for connecting the first chamber and the reservoir; and
    a damping force control mechanism for adjusting damping force by controlling a flow of hydraulic liquid in the passage;
    an orifice passage provided in parallel to at least one of the first check valve and the second check valve; and
    a sub-check valve provided in the orifice passage, the sub-check valve being configured to open at a lower pressure than the check valve to which the orifice passage is provided in parallel and to allow a flow of hydraulic liquid in a same direction as the check valve,
    wherein the damping force control mechanism is a pilot-type control valve, and
    wherein the piston speeds at which the first check valve and the second check valve open, respectively, are lower than a piston speed at which the pilot-type control valve opens.

2. The damping force control type shock absorber of claim 1, wherein the pilot-type control valve is a pilot-type pressure control valve.

3. The damping force control type shock absorber of claim 1, wherein the pilot-valve control valve is a pilot-type flow control valve.

4. The damping force control type shock absorber of claim 1, wherein piston speeds at which the first check valve and the second check valve open, respectively, are not more than 0.1 m/s.

5. The damping force control type shock absorber of claim 1, wherein the piston includes a passage for communicating between the second chamber and the first chamber;
    the orifice passage being provided in the first check valve so as to be alignable with the passage in the piston;
    the sub-check valve including a sub-check valve disk;
    the first check valve including:
    a check valve disk provided closer to the passage in the piston and forming at least a part of the orifice passage; and
    the sub-check valve disk stacked over the check valve disk and urged in a direction for closing the orifice passage;
    wherein, when the piston moves at a first piston speed, which is a predetermined speed, the sub-check valve disk is held to close the orifice passage, so that the hydraulic liquid passes through only a notch of the check valve disk to flow from the second chamber into the first chamber through the passage in the piston;
    wherein, when the piston moves at a second piston speed higher than the first piston speed, the sub-check valve disk is moved to open the orifice passage by an increase in pressure in the second chamber, so that the hydraulic liquid in the second chamber flows into the first chamber through the passage in the piston and the orifice passage; and wherein, when the piston moves at a third piston speed higher than the second piston speed, the check valve disk is moved away from the piston by a further increase in pressure in the second chamber, so that the check valve as a whole is moved to open the passage in the piston, thereby allowing the hydraulic liquid in the second chamber to flow directly into the first chamber through the passage in the piston without passing through the orifice passage.

6. The damping force control type shock absorber of claim 1, wherein the base valve includes a passage for communicating between the reservoir and the second chamber;

the orifice passage being provided in the second check valve so as to be alignable with the passage in the base valve;
the sub-check valve including a sub-check valve disk;
the second check valve including:
a check valve disk provided closer to the passage in the base valve and forming at least a part of the orifice passage; and
the sub-check valve disk stacked over the check valve disk and urged in a direction for closing the orifice passage;
wherein, when the piston moves at a first piston speed, which is a predetermined speed, the sub-check valve disk is held to close the orifice passage, so that the hydraulic liquid passes through only a notch of the check valve disk to flow from the reservoir into the second chamber through the passage in the base valve wherein, when the piston moves at a second piston speed higher than the first piston speed, the sub-check valve disk is moved to open the orifice passage by an increase in differential pressure between the reservoir and the second chamber, so that the hydraulic liquid in the reservoir flows into the second chamber through the passage in the base valve and the orifice passage; and wherein, when the piston moves at a third piston speed higher than the second piston speed, the check valve disk is moved away from the base valve by a further increase in differential pressure between the reservoir and the second chamber, so that the second check valve as a whole is moved in a direction for opening the passage in the base valve, thereby allowing the hydraulic liquid in the reservoir to flow directly into the second chamber through the passage in the base valve without passing through the orifice passage.

\* \* \* \* \*